US 6,587,809 B2

United States Patent
Majoe

(10) Patent No.: US 6,587,809 B2
(45) Date of Patent: Jul. 1, 2003

(54) POSITION AND ORIENTATION DETECTION SYSTEM

(75) Inventor: Dennis Majoe, Southampton (GB)

(73) Assignee: Hypervision Limited, Hampshire (GB)

( * ) Notice: Subject to any disclaimer, the term of this patent is extended or adjusted under 35 U.S.C. 154(b) by 0 days.

(21) Appl. No.: 09/979,370

(22) PCT Filed: Dec. 15, 2000

(86) PCT No.: PCT/GB00/04810

§ 371 (c)(1), (2), (4) Date: May 15, 2002

(87) PCT Pub. No.: WO02/48647

PCT Pub. Date: Jun. 20, 2002

(65) Prior Publication Data

US 2002/0152040 A1 Oct. 17, 2002

(51) Int. Cl.⁷ .............................. G01L 1/00; G06K 9/00; G06T 7/20
(52) U.S. Cl. ...................... 702/150; 348/139; 382/103; 382/107; 356/139.03; 356/141; 700/259
(58) Field of Search ........................ 702/92, 94, 150, 702/155; 356/141.1, 139.03; 250/559.44; 700/259; 382/103, 107

(56) References Cited

U.S. PATENT DOCUMENTS

| 4,146,924 A | 3/1979 | Birk et al. ............... 700/259 |
| 4,396,945 A | 8/1983 | DiMatteo et al. ........... 348/139 |
| 5,086,404 A | 2/1992 | Claussen ............... 356/139.03 |
| 5,196,900 A | 3/1993 | Pettersen ................ 356/141 |
| 5,828,770 A | 10/1998 | Leis et al. ............... 382/103 |
| 5,963,891 A | 10/1999 | Walker et al. ............. 702/150 |
| 6,324,296 B1 * | 11/2001 | McSheery et al. .......... 382/107 |

FOREIGN PATENT DOCUMENTS

| EP | 0 162 713 A2 | 11/1985 |
| EP | 0 753 836 A3 | 1/1997 |
| GB | 2002986 | 2/1979 |
| GB | 2280504 | 2/1995 |
| GB | 2289756 | 11/1995 |
| GB | 2348280 | 9/2000 |
| WO | WO 94/23647 | 10/1994 |
| WO | WO 00/70304 | 11/2000 |

* cited by examiner

*Primary Examiner*—John Barlow
*Assistant Examiner*—John Le
(74) *Attorney, Agent, or Firm*—Sheridan Ross PC

(57) ABSTRACT

A system for determining the position, orientation and deformation in 3 dimensional space of a moving object in real-time is provided having a plurality of activatable markers which are mounted onto the object and a sensor section comprising a plurality of individual sensors as shown diagrammatically in FIG. 1. Individual markers are activated in sequence with only one marker energized at any time. Energy emitted by each activated marker is detected by the plurality of sensors positioned remotely. Since only one marker is activated at any time individual determination of the position of the particular energized marker is simplified. Individual sensors are arranged such that each sensor receives a different energy level from an energized marker depending on the relative position of the marker to the sensor. A control unit analyzes the energy distribution range to determine the actual marker position. The system compensates for ambient energy and sensor saturation.

17 Claims, 6 Drawing Sheets

POSITION AND ORIENTATION DETECTION SYSTEM

CROSS-REFERENCES TO RELATED APPLICATIONS

Not applicable.

STATEMENT REGARDING FEDERALLY SPONSORED RESEARCH OR DEVELOPMENT

Not applicable.

REFERENCE TO A "MICROFICHE" INDEX

Not applicable.

BACKGROUND OF THE INVENTION

1. Field of the Invention

This invention generally relates to systems for determining the position and orientation of an object which may deform in shape over time and which use the detection of energy emitted from markers placed on the object.

2. Description of the Related Art

As is known in the art, passive systems exist which rely on the markers being illuminated with energy that reflects off the markers and is detected by the sensor system. Active systems also exist in which the markers are individual sources of energy. In both cases the energy is focused onto spaced sensors, such that the position of an energised marker is identified by the sub set of adjacent sensor points that are recording an energy level above a given threshold.

By identifying which adjacent sensors are detecting energy above the threshold, the associated computing devices can estimate the position of the marker emitting the energy in a given plane in space since the focusing function relates a point in space to a sensor on the sensor system. To achieve a high resolution measurement from such systems a very large number of sensors need to be positioned adjacent to each other as each sensor relates to a point in space. Having a large number of sensors leads to a degradation in the capture rate as the signal levels must be digitised for a large number of sensors. By using three displaced sensor sets, the position of the marker can be calculated to a certain level of accuracy in 3 dimensional space.

In such systems energy from the marker is directly focused onto the sensors so that only a small number of sensors detect energy over the given threshold. Such systems do not measure the distribution of energy levels across a large percentage of the total number of sensors and do not calculate the position of the marker based on an energy distribution function for which a maximum value occurs for a calculated marker position.

In passive systems all illuminated markers are energised and detected simultaneously.

Therefore the computing device needs firstly to identify which sub set of adjacent sensors detecting energy above the given threshold correspond to which marker. Secondly it must track each marker from one sample to the next and attempt to distinguish each marker at all times. This results in the possibility of errors where marker assignments are lost and requires intensive processing methods.

Active systems may illuminate all markers at the same time or they can cycle the illumination of each marker to aid the computing system distinguish individual markers. If all markers illuminate at the same time, the computing device must be able to identify the correspondence of each marker and each energy detection and it must then track each marker in a similar way to the passive system.

In an active system that illuminates each marker individually, the computing device can immediately make the correspondence of marker energy emission and detection since the cycle time will be known. As each energy emission is recorded separately, no tracking is required and the position is simply calculated for each illumination. In one such system the sensor set is a multiple charge coupled device (CCD) onto which the energy is focused. To detect in 3D space at least three CCD detectors are used. In order to achieve high measurement resolution the CCD must have a large number of detecting sensors since the focusing function relates a point in space to each sensor point on the CCD. In order to achieve very high sample rates for a large number of markers the CCD must be driven at very high rates, well above the needs of conventional CCD devices. High resolution CCD devices capable of working at high data capture rates are expensive. In addition systems that use CCD devices have a measurement non-linearity dependent on the ability of the lens component to accurately focus the marker points linearly across the CCD sensor surface and not introduce any aberration.

As the CCD is moved further away from the markers on the object of interest, the measurement scaling changes since the focused image of the markers on the sensor system changes in size. Due to lens aberration and changes in measurement scaling such systems require a calibration phase in which an object of known dimensions is introduced for sampling. This calibration task is inconvenient, often needs experienced personnel to perform it and is considered a negative aspect from the point of view of end user.

BRIEF SUMMARY OF THE INVENTION

In accordance with the present invention, a system for determining the position, orientation and deformation in 3 dimensional space of a moving object in real-time is provided having a plurality of activatable markers which are mounted onto parts of the object for which a position value needs to be recorded, a drive unit which drives the activatable markers in a defined sequence, a sensor section comprising a plurality of sensors remote from the markers and suitably arranged such that the energy falling on the sensor is dependent on the relative position of the energised marker and the sensor, a data capture unit which digitises the signals sensed by each sensor and a control unit which processes the signals received from the data capture unit.

The object may move in space and may deform in shape and the markers are mounted so as to move with the object and follow the shape deformation.

Each marker is activated individually for a period of time by the drive unit in a sequence known to the data capture unit and the control unit. While each marker is illuminated the energy from the marker is detected by all sensors. The sensors are arranged such that the energy distribution sensed by the plurality of markers for a single energised marker is a function of the position of the marker. The digitised energy levels are transmitted to the control unit at high speed and the information is processed to determine the position of the marker. The control unit calculates the position of the marker based on an energy distribution function for which a maximum value occurs for a calculated marker position.

By using this approach relatively few sensors are needed to determine marker position. This results in low digitisation and data collection overheads and therefore faster sample rates than if CCD devices were used. In addition by using a much lower number of sensor components significant cost reductions are achievable.

It is important to stress that the amplitude of the energy signal is not used to determine the position of the marker rather it is the energy distribution pattern over a number of sensors. For example the distance from the marker to a sensor is not calculated using the energy amplitude detected per se; in which case the emitter and sensor would need to be finely calibrated.

Since accurate signal strength values are unnecessary calibration of the energy emission and detection components is unnecessary.

Since the system relies on the way energy is distributed over the sensors, there is no need to calibrate the system for measurement scaling.

Since only one marker is activated at one time during a single cycle, the sensor section can individually determine the position of each marker as each marker is separately illuminated thereby making marker tracking unnecessary.

To reduce significantly the effect of external ambient energy radiation being superimposed upon the energy signal emitted by each marker the drive unit can split each specific marker illumination period into two parts. In the first part the marker is fully illuminated and the signal level detected is digitised. During a second part the marker is not illuminated and instead the data capture unit samples the ambient energy signal for each sensor and digitises it. Since the time interval between the two samples is very small the ambient energy level can be assumed to equal the subsequent ambient energy signal recorded and since the effect of ambient energy on marker energy detection can be considered to follow a simple superimposition rule, the final signal level attributed to the marker is the illuminated signal level less the ambient signal level. This subtraction can be performed by the data capture unit and the result can be transmitted to the control unit.

To deal with possible saturation of sensors due to the marker being too close to a group of sensors the drive unit can be designed to drive the marker with maximum illumination followed by a period of illumination at 50% of maximum, followed by the zero illumination level for the purposes of ambient energy detection. In cases where the maximum illumination level results in a saturation of the sensors, the data capture unit can globally choose to use the energy levels recorded during the time at which the drive unit illuminated the marker at 50% of maximum drive. In this way the system can automatically adapt to saturation of the sensors which may occur if the marker is positioned very close to the sensors in which case the signal values detected during the period of lower energy emission are used for the calculations.

In a preferred embodiment of the invention, the system includes: a plurality of infra red emitting markers that can be mounted to points of interest on the object; a drive unit which sequences the activation of the markers according to a synchronisation signal derived from the control unit; a sensor section, preferably a linear array of infra red sensors where each sensor is set approximately 75 mm apart and placed behind a linear collimator slot orthogonal to the linear array axis; a data capture section comprising a set of microprocessors which read the sensor levels and send the data to a control unit; a control unit comprising a processor to calculate the position of each marker and a data reception part for reception of the sensor level data from the data capture unit.

The sensors are provided with a collimator through which the energy may pass only up to a limited angle of incidence after which the sensor detects no energy. When the marker is directly positioned above a sensor the full energy of the marker is detected however as the marker moves away from the perpendicular axis adjoining the sensor, the energy level detected reduces as the collimator begins to attenuate the energy emitted by the marker.

The control unit activates the drive unit to begin the illumination of markers in a sequence known to the control unit. The sensor section detects the emitted energy and the data capture section digitises the levels and transmits them to the control unit. On reception the control unit analyses the data from a single sensor axis and calculates the most likely point along the length of the sensor axis which corresponds to the nearest point between the axis and the marker.

The control unit may receive data from several sensor axes, at least three, and will compute the 3D position of the marker in 3D space.

The control unit may display the information, store it or transmit it to another computing device for further use.

BRIEF DESCRIPTION OF THE SEVERAL VIEWS OF THE DRAWINGS

FIG. 4a is the flow chart for the synchronisation, reception and co-ordinate processing by the control unit.

FIG. 4b is the flow chart for the sensor signal digitisation by the data capture unit.

FIG. 4c is the drive sequence flow chart for the illumination of markers. T is the total period of drive time specified for one marker.

DETAILED DESCRIPTION OF THE INVENTION

Figure 1:
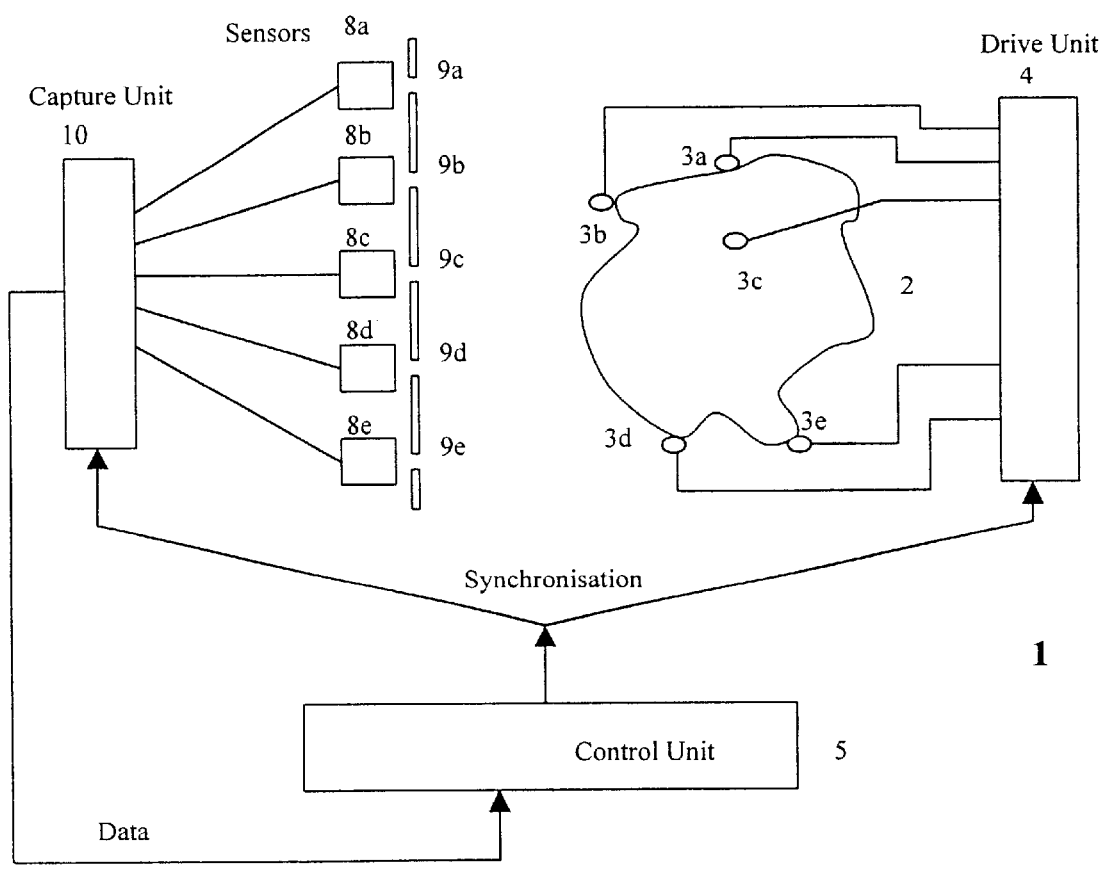
FIG. 1 is a block diagram of a system for determining the position in 3 dimensional space of a moving object in real-time according to the invention.
Figure 2:
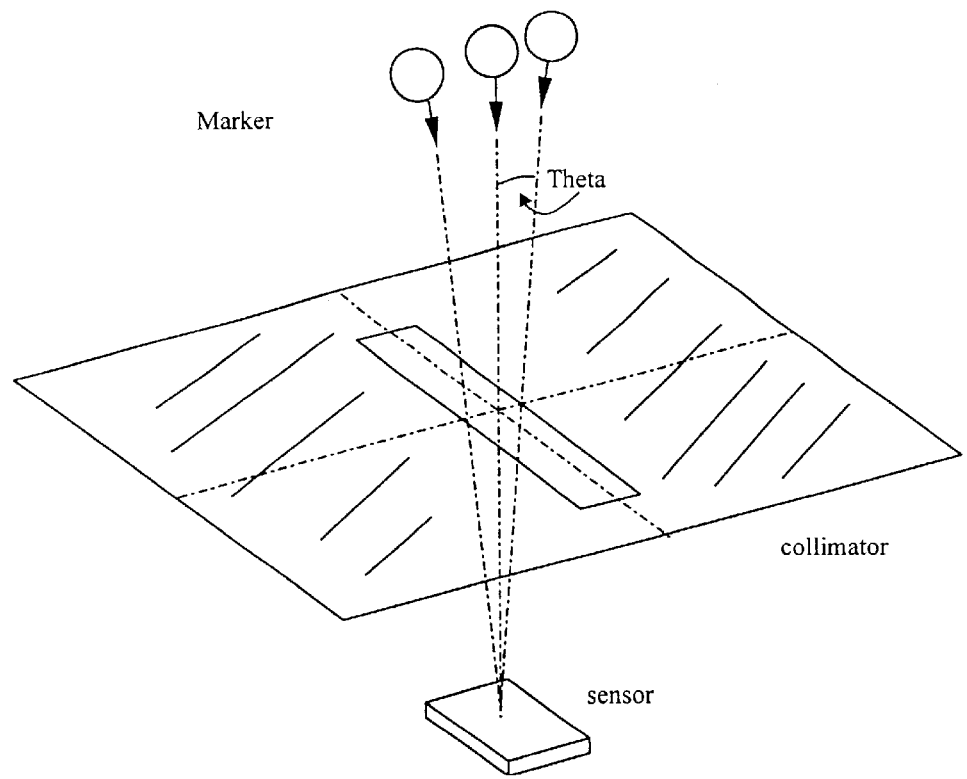
FIG. 2 is a diagram indicating how energy emitted from a marker in different positions falls onto a sensor masked with a slot collimator.

Referring to FIG. 1 a system 1 for determining the position, orientation and deformation in three dimensional space of a moving object 2 is provided wherein a plurality of, in this instance five, active emitters or markers 3a, 3b, 3c, 3d, 3e affixed to the object 2 are activated by a drive unit 4 following a set sequence, for example 3a then 3b then 3c then 3d then 3e for each cycle, known to the control unit 5. The drive unit begins a drive cycle as a result of a synchronisation signal 6 sent by the control unit 5. As each marker is illuminated in turn by the drive unit, emitted energy from each marker is detected by a linear array of sensors 7 containing sensors 8*a*, 8*b*, 8*c*, 8*d*, 8*e*, displaced by a distance depending on the resolution required but preferably 75 mm, and positioned behind collimating slots 9, which are arranged orthogonal to the array axis. The slots 9*a*, 9*b*, 9*c*, 9*d*, 9*e*, act as barriers to energy arriving at an angle greater than Theta but pass energy arriving within this angle of incidence. As shown in FIG. 2, this arrangement ensures that a marker can be detected only if it is within a region of space running perpendicular to the linear array. It also ensures that the level of energy detected by adjacent sensors decreases on either side of the point along the length of the sensor axis which corresponds to the nearest point between the axis and the marker. The data capture unit 10, receives the synchronisation signal from the control unit and synchronises the digitisation of the energy levels detected by the sensors 8, and transmits them to the control unit 5. The control unit 5 calculates for each linear array and for each marker the position along the length of the sensor axis that corresponds to the nearest point between the axis and the marker.

Figure 4A:
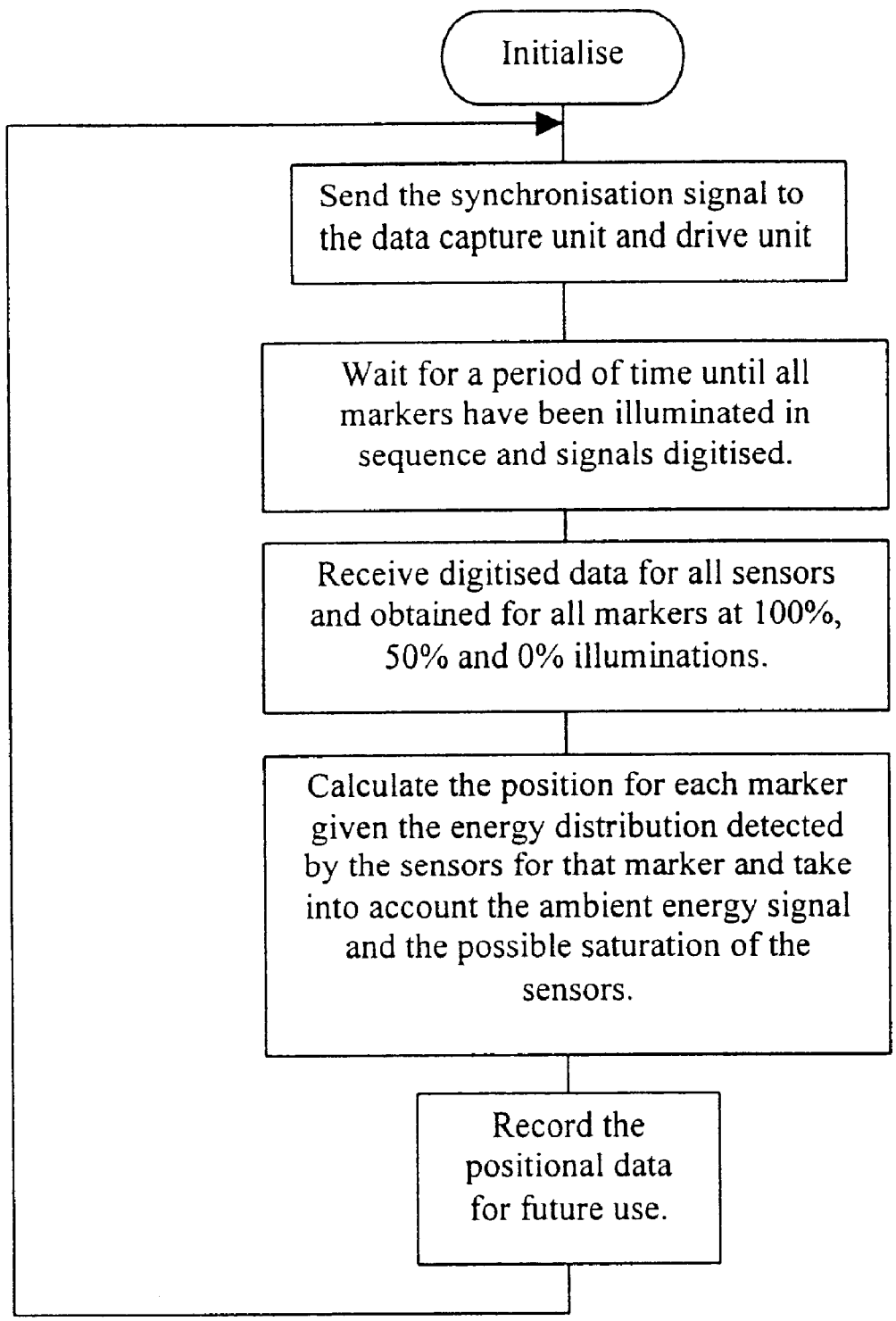
FIGS. 4a–4c are flow charts of the sub processes used by the system in FIG. 1 in determining the position in 3 dimensional space of a moving object in real-time according to the invention, and in particular.
Figure 4B:
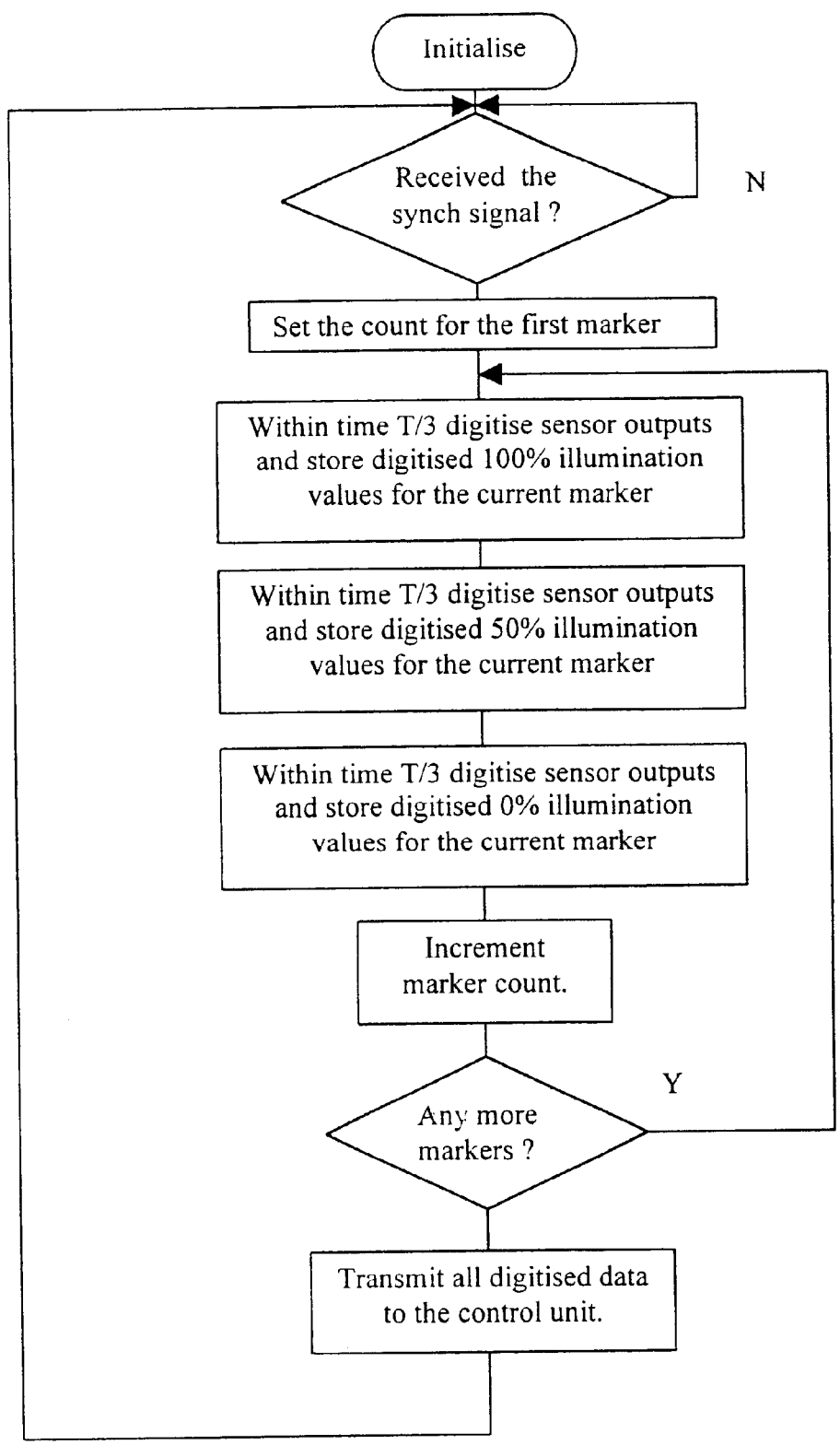
Figure 4C:
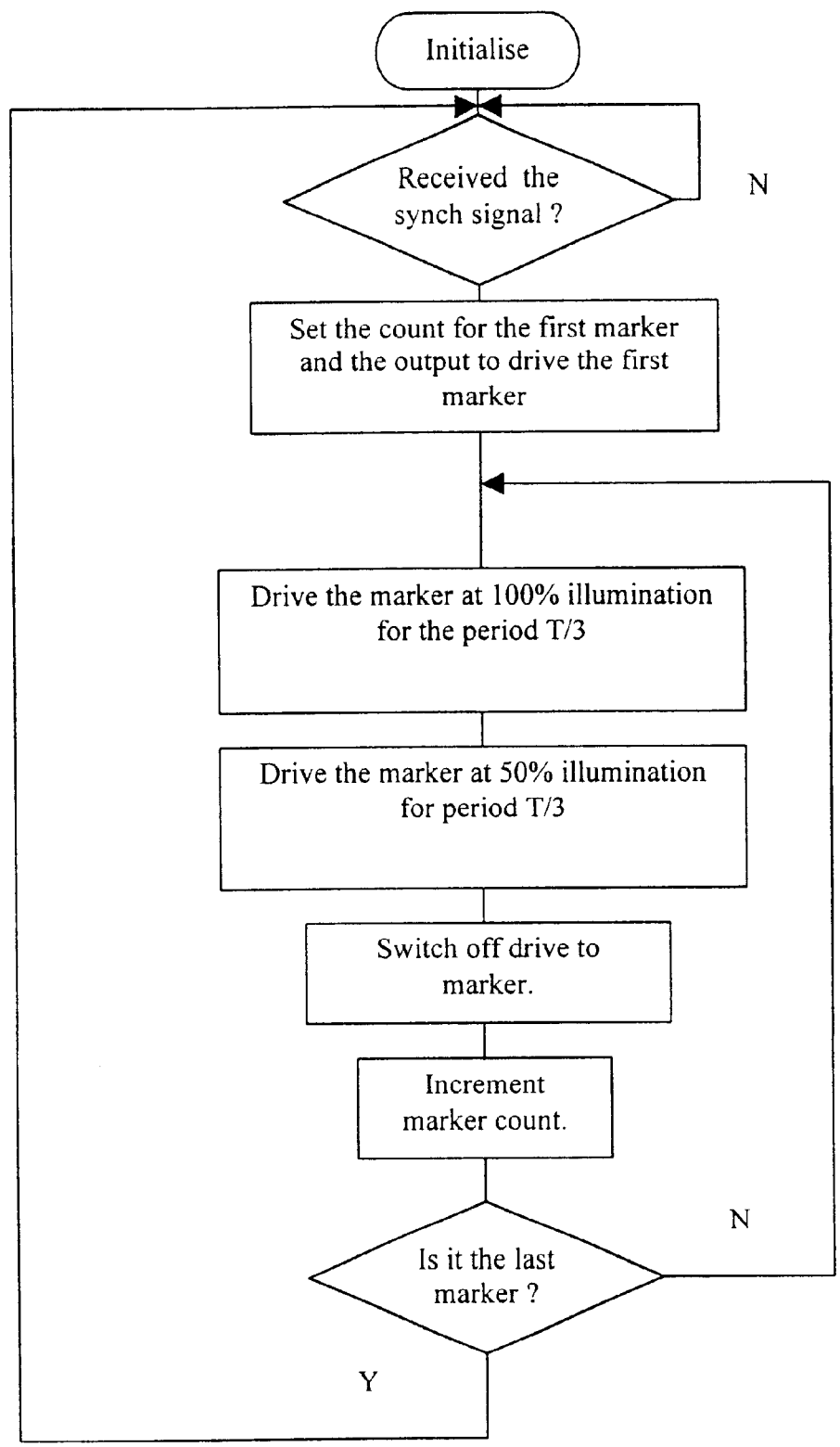

The flow diagrams of FIGS. 4*a*, 4*b* and 4*c*, explains the processes involved in the control unit, the data capture unit and the drive unit.

Figure 3:
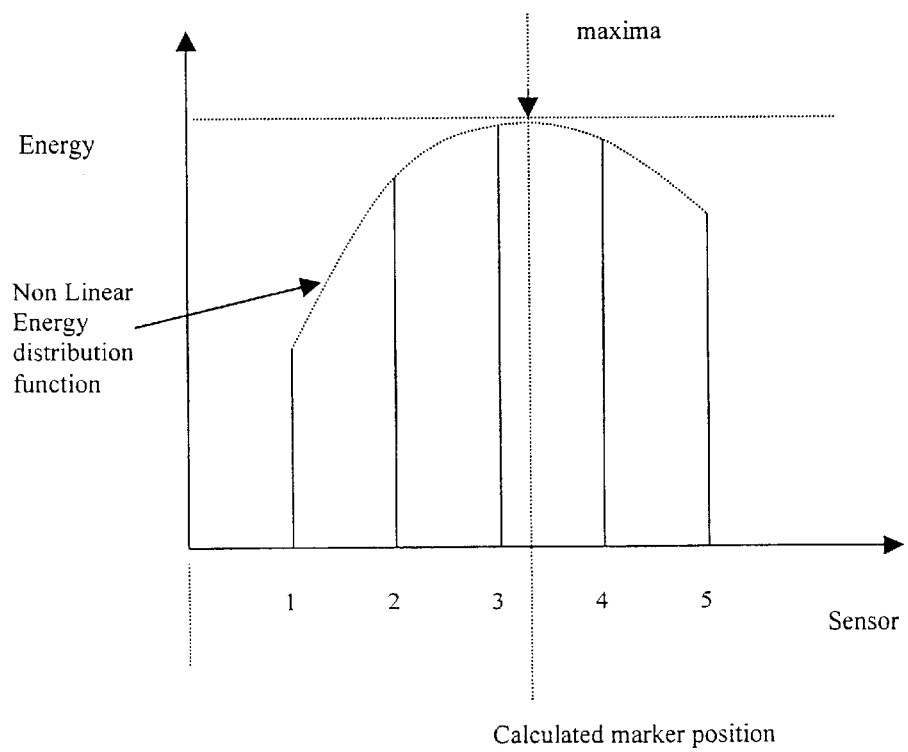
FIG. 3 is a graph depicting the intensity of energy received from each sensor arrangement where 5 sensor arrangements 1,2,3,4,5 are placed in a straight line and equidistant to each other.

In the preferred embodiment, the calculation of the position of a marker relative to a linear sensor array is performed by the control unit 5. The control unit receives energy signal information from all sensors in the array corresponding to an activated marker. FIG. 3 is a graph depicting the energy distribution in a typical linear sensor array of 5 sensors. The control unit processor loads the signal level values from each sensor into an array in memory and determines which sensors are registering a signal level above zero. Depending on the sensor arrangement the energy distribution function can be described by linear, quasi-linear or non-linear equations. In one embodiment the energy distribution is parabolic in shape and therefore the processor computes the coefficients of a quadratic equation that will best fit the energy distribution data.

Having determined the equation coefficients, the estimate for the marker position is calculated as the point for which the equation evaluates to a maximum.

Having calculated the position of the marker relative for the particular sensor array, the control unit 5 loads data relating to the next sensory array and applies the same algorithm to determine the position of the marker relative to that sensor array. Once all sensor array data has been processed for the marker of concern, sensor data relating to the next marker in the sequence can be processed. If more than one processor is used in the control unit, this processing may be shared across processors.

Once all marker positions have been calculated the marker position data may be further processed according to the needs of the application.

Figure 5:
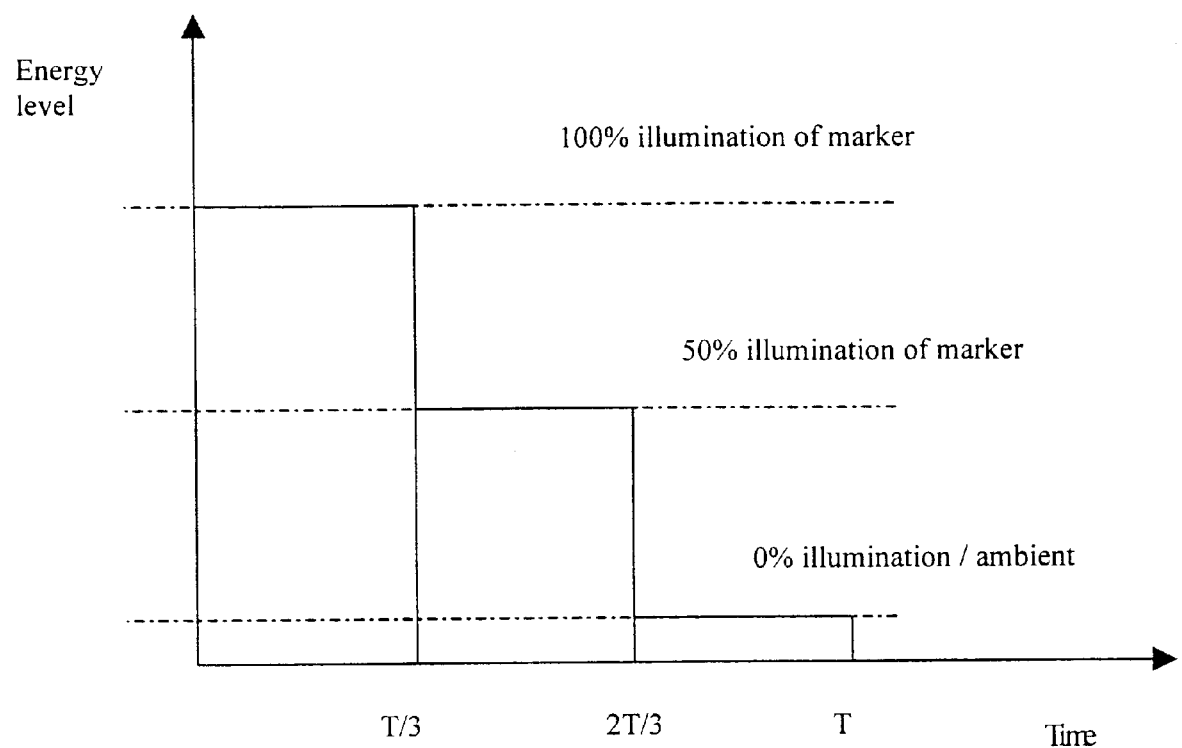
FIG. 5 depicts the energy levels from a single sensor during a typical marker illumination sequence showing the levels recorded during maximum illumination, 50% of maximum and during ambient recording. T is the total period of drive time specified for one marker

FIG. 5 depicts the sensor level value for one sensor during the activation of a single marker in time. The figure shows at 1, the signal level recorded when the marker is illuminated at maximum energy output, and shows at 2, the signal level recorded when the marker is illuminated at 50% of maximum energy and shows at 3, the signal level recorded when the marker is not illuminated at all. The data capture unit 10 samples and digitises the levels at each point 1,2 and 3 and stores these values. The capture unit 10 examines all sensor levels associated with the maximum energy emission timing and determines if any are higher than a level that would suggest at least one sensor was in saturation. If a single sensor is in saturation then the capture unit 10 will default to using only digitised sensor values recorded during the time that only 50% energy was emitted from the marker. In this way the capture unit can make a significant contribution to filtering data from saturated sensors which would degrade the marker position calculation accuracy.

In order to compensate for ambient radiation, the capture unit 10 will subtract from the saturation filtered energy signal, the level recorded during the time of zero illumination of the marker. Since the time interval between the two samples is very small, the ambient energy level can be assumed to equal the ambient energy present during the time that the marker was illuminated at either 100% or 50% of the maximum. Since the effect of ambient energy on marker energy detection can be considered to follow a simple superimposition rule, the final signal level attributed to the marker is the illuminated signal level less the ambient signal level. The capture unit 10 therefore performs the subtraction and stores the result for subsequent transmission to the control unit 5, for processing.

What is claimed is:

1. A system for determining position, orientation and deformation in 3-D space of at least one moving object in real time, the system comprising:
    a plurality of energy emitting markers for placing for movement with the object;
    driving means coupled to the markers for driving the markers;
    a plurality of stationary sensors, each for sensing energy emitted from the markers;
    detection means coupled to the sensors for detecting the energy sensed by the sensors; and
    processing means for controlling the driving means so that the markers emit energy in a predetermined order and for processing the detected energies to derive position, orientation and deformation information for the object;
    wherein:
    the sensors are arranged in a linear array along an axis; and
    each sensor in the array has a respective collimator arranged so that:
        the respective sensor receives full energy from a marker when the angle between the line which connects the sensor to the marker and the plane which is perpendicular to the array axis is zero;
        the collimator increasingly attenuates the received energy as said angle increases from zero; and
        the collimator blocks the energy from the marker when said angle exceeds a predetermined angle.

2. A system as claimed in claim 1, wherein the pitch of the sensors in the array is constant.

3. A system as claimed in claim 1, wherein each collimator is provided by a slot in a panel covering the respective sensor, and the longitudinal axis of each slot is orthogonal to the array axis.

4. A system as claimed in claim 3, wherein the pitch of the slots is constant.

5. A system as claimed in claim 3, wherein the distance between each slot and the respective sensor is similar to the length of the slot.

6. A system as claimed in claim 3, wherein the width of each slot is similar to the width of the respective sensor.

7. A system as claimed in claim 1, wherein the processing means is operable, in the case where the energy emitted from one of the markers is detected by a plurality of the sensors in the array, to calculate from the detected energies a position of a maximum in the energy distribution falling on the sensors.

8. A system as claimed in claim 1, wherein the processing means is operable:
- to determine detected ambient energies for the sensors when the markers are not driven;
- to subtract the detected ambient energy for each sensor from the detected energy for that sensor when the markers are driven to obtain a compensated energy for that sensor; and
- to process the compensated energies to derive the position, orientation and deformation information for the object.

9. A system as claimed in claim 1, wherein:
the driving means is operable to drive the markers with a first drive energy and with a second drive energy that is half of the first drive energy; and
the processing means is operable:
- to determine whether or not the detected energy for any of the sensors in the array when the markers are driven with the first drive energy indicates saturation of that sensor and,
- if so, to process the detected energies when the markers are driven with second drive energy to derive the position, orientation and deformation information for the object,
- but, if not, to process the detected energies when the markers are driven with the first drive energy to derive the position, orientation and deformation information for the object.

10. A system as claimed in claim 1, including at least three such arrays of the sensors.

11. A system as claimed in claim 10, wherein, for each array, the processing means is operable to determine the positions of the respective markers relative to that array by processing the detected energies for the sensors in that array.

12. A method of determining position, orientation and deformation in 3-D space of at least one moving object in real time, the method comprising:
- placing a plurality of energy emitting markers for movement with the object;
- driving the markers;
- using a plurality of stationary sensors, each for sensing energy emitted from the markers;
- detecting the energy sensed by the sensors;
- controlling the driving step so that the markers emit energy in a predetermined order; and
- processing the detected energies to derive position, orientation and deformation information for the object;

wherein:
- arranging at least some of the sensors in a linear array along an axis; and
- providing a respective collimator for each sensor in the array arranged so that:
  - the respective sensor receives full energy from a marker when the angle between the line which connects the sensor to the marker and the plane which is perpendicular to the array axis is zero;
  - the collimator increasingly attenuates the received energy as said angle increases from zero; and
  - the collimator blocks the energy from the marker when said angle exceeds a predetermined angle.

13. A method as claimed in claim 12, wherein the processing step includes, in the case where the energy emitted from one of the markers is detected by a plurality of the sensors in the array, a step of calculating from the detected energies a position of a maximum in the energy distribution falling on the sensors.

14. A method as claimed in claim 12, wherein the processing step includes:
- determining detected ambient energies for the sensors when the markers are not driven;
- subtracting the detected ambient energy for each sensor from the detected energy for that sensor when the markers are driven to obtain a compensated energy for that sensor; and
- processing the compensated energies to derive the position, orientation and deformation information for the object.

15. A method as claimed in claim 12, wherein:
the controlling step includes controlling the markers so that they are driven with a first drive energy and with a second drive energy that is half of the first drive energy; and
the processing step includes:
- determining whether or not the detected energy for any of the sensors in the array when the markers are driven with the first drive energy indicates saturation of that sensor and,
- if so, processing the detected energies when the markers are driven with the second drive energy to derive the position, orientation and deformation information for the object,
- but, if not, processing the detected energies when the markers are driven with the first drive energy to derive the position, orientation and deformation information for the object.

16. A method as claimed in claim 12, including the step of providing at least three such arrays of the sensors.

17. A method as claimed in claim 16, wherein, for each array, the processing step includes determining the positions of the respective markers relative to that array by processing the detected energies for the sensors in that array.

* * * * *